United States Patent
Ichiki

(10) Patent No.: US 8,335,216 B2
(45) Date of Patent: Dec. 18, 2012

(54) NETWORK FACSIMILE APPARATUS AND NETWORK FACSIMILE SYSTEM

(75) Inventor: Toru Ichiki, Sagamihara (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1457 days.

(21) Appl. No.: 11/798,723

(22) Filed: May 16, 2007

(65) Prior Publication Data
US 2007/0291748 A1 Dec. 20, 2007

(30) Foreign Application Priority Data
Jun. 16, 2006 (JP) .................... 2006-168028

(51) Int. Cl.
*H04L 12/28* (2006.01)
(52) U.S. Cl. ........................ 370/392; 370/401
(58) Field of Classification Search ............ 379/100.01; 370/392, 401
See application file for complete search history.

(56) References Cited

U.S. PATENT DOCUMENTS
2007/0115978 A1* 5/2007 Kondo .................... 370/392

FOREIGN PATENT DOCUMENTS
JP 04-010752 1/1992
JP 2006-025171 1/2006

OTHER PUBLICATIONS
Japanese Office Action dated Sep. 29, 2009.
Japanese Office Action dated May 8, 2008.

* cited by examiner

*Primary Examiner* — Creighton Smith
(74) *Attorney, Agent, or Firm* — Finnegan, Henderson, Farabow, Garrett & Dunner, L.L.P.

(57) ABSTRACT

There is described a network facsimile apparatus, which makes it possible to quickly complete the transmitting operation of reserved image data whose transmission is temporarily suspended due to the BUSY status of the receiver side, etc. The apparatus, serving as a caller that conducts image data communicating operations with other apparatuses serving as callees based on a Session Initiation Protocol, includes a control section to suspend an operation for transmitting image data to the first callee; a storage section to store the first IP address of the first callee; a network interface control section; and a comparing section to compare the first IP address with the second IP address. When the control section determines that the first IP address and the second IP address coincide with each other, the control section transmits the reserved image data, transmission of which is currently suspended, to the second callee.

16 Claims, 12 Drawing Sheets

NETWORK FACSIMILE APPARATUS AND NETWORK FACSIMILE SYSTEM

This application is based on Japanese Patent Application No. 2006-168028 filed on Jun. 16, 2006 with Japan Patent Office, the entire content of which is hereby incorporated by reference.

BACKGROUND OF THE INVENTION

The present invention relates to a network facsimile apparatus, which conducts a session control operation based on the Session Initiation Protocol (SIP), and, after the session is established, conducts an image communication processing by employing another port.

As one of communication methods for the network facsimile transmission, there has been a method called the SIP-FAX in which image data are transmitted between a transmitter and a receiver, which are coupled to each other through a network, such as the Internet, etc., in the peer-to-peer network architecture by employing the Session Initiation Protocol.

When such the SIP-FAX method, in which the facsimile communication is conducted after establishing the connection between the transmitter and the receiver, is employed, sometimes, it would be impossible to transmit image data to the receiver due to the BUSY status of the receiver. In this case, since the transmitter cannot recognize the time when the receiver resumes the READY status, the transmitter conducts such a recovery operation that the transmitter tries to transmit again the image data by automatically issuing a recall action when a predetermined time (for instance, three minutes) has elapsed since the last call.

On the other hand, with respect to the IP telephone, which employs the VoIP (Voice over Internet Protocol), Patent Document 1 (Tokkai 2005-65049, Japanese Non-Examined Patent Publication) sets forth a technology in which, when another receipt is received during a call being currently busy over the telephone, a telephone number of the other receipt is memorized, and, at the same time, a voice response reply saying "recall later" is transmitted, and then, after the current call is finalized, an automatic recall action is conducted for the sender of the other receipt.

Further, to improve the availability of the IP terminal device, which enables a bilateral vocal communication such as telephone conversation, etc., there have been proposed various kinds of technologies, including a technology which makes it possible to automatically reply a message to a sender of another receipt when the other receipt is received during a communication being currently busy over the telephone, another technology which makes it possible to record the message sent from the sender of the other receipt, etc., (for instance, set forth in Tokkai 2005-269165, Japanese Non-Examined Patent Publication).

In the bilateral vocal communication such as the IP telephone, as far as the connection with the sender of the other receipt, received during the communication being currently busy, is established as a result of the automatic recall action conducted after the current communication is finalized, it is possible to achieve a matter by talks with the partner, irrespective of either who initially gave the call to the other.

In the SIP-FAX, however, even if the automatic recall action is conducted for the sender of the other receipt, received during the communication being currently busy, after the current communication is finalized, it is impossible for the caller to make the recalled partner (the sender of the other receipt, serving as a callee) transmit the image data stored in it to the caller, since the callee merely tries to conduct the facsimile receiving operation. For this reason, conventionally, there has been no way for making the callee transmit the image data reserved in it to the caller, except the method for recalling the callee from the caller side. Accordingly, there has been a problem that it is ineffective to wait the automatic recall action to be initiated after three minutes has elapsed, since it takes much time to complete a transmission job.

Further, although it would be possible to shorten the time period for completing the transmission job by shortening the waiting time until the automatic recall action is initiated, it is not preferable that the network incurs excessive burden due to the possible increase of a number of recalling times.

Incidentally, the cause of inability of receiving the image data at the time of its receipt is not only limited to the communication being currently busy on the line, but also assumed as one of various kinds of statuses, such as a warming up status of the apparatus, etc.

SUMMARY OF THE INVENTION

To overcome the abovementioned drawbacks in conventional network facsimile apparatuses, it is one of objects of the present invention to provide a network facsimile apparatus, which makes it possible to quickly complete the transmitting operation of reserved image data whose transmission is temporarily suspended due to the BUSY status of the receiver side, etc.

Accordingly, at least one of objects of the present invention can be attained by each of the network facsimile apparatus and the network facsimile system described as follows.

(1) According to a network facsimile apparatus reflecting an aspect of the present invention, the network facsimile apparatus, serving as a caller that establishes a session based on a Session Initiation Protocol to conduct image data communicating operations with other apparatuses serving as callees including a first callee and a second callee, comprises: a control section to suspend an operation for transmitting image data to the first callee when the first callee sends a communication incapable signal back to the caller in response to a session establishment request directed to the first callee and originally issued by the caller; a storage section to store a first IP address of the first callee; a network interface control section that receives a session establishment request sent from the second callee after the first IP address of the first callee is stored in the storage section, and then, sends a session establishment response back to the second callee; and a comparing section to compare the first IP address of the first callee, stored in the storage section, with a second IP address of the second callee, when image data are not transmitted to the caller from the second callee within a predetermined time interval after the session establishment response is sent back to the second callee; wherein, when the control section determines that the first IP address and the second IP address coincide with each other, based on a comparison result of the comparing section, the control section conducts controlling operations so as to transmits the image data, transmission of which is currently suspended, to the second callee.

(2) According to a network facsimile system reflecting an aspect of the present invention, the network facsimile system comprises: a network facsimile apparatus serving as a caller; a first network facsimile apparatus serving as a first callee; and a second network facsimile apparatus serving as a second callee; wherein each of the network facsimile apparatus, the first network facsimile apparatus and the second network facsimile apparatus establishes a session based on a Session Initiation Protocol to conduct image data communicating operations with other apparatuses coupled to the network facsimile system: and wherein the network facsimile apparatus comprises: a control section to suspend an operation for transmitting image data to the first network facsimile apparatus serving as the first callee when the first callee sends a communication incapable signal back to the network facsimile apparatus serving as the caller in response to a session establishment request directed to the first callee and originally issued by the caller; a storage section to store a first IP address of the first callee; a network interface control section that receives a session establishment request sent from the second callee after the first IP address of the first callee is stored in the storage section, and then, sends a session establishment response back to the second callee; a comparing section to compare the first IP address of the first callee, stored in the storage section, with a second IP address of the second callee, when image data are not transmitted to the caller from the second callee within a first predetermined time interval after the session establishment response is sent back to the second callee; and wherein the first network facsimile apparatus, comprises: a first network interface control section that receives a session establishment request sent from the caller; a first control section to control the first network interface control section so that a communication incapable signal is sent back to the caller in response to the session establishment request received by the first network interface control section when the first callee is currently in a state incapable of establishing the session; and a first storage section to store an IP address of the caller; and wherein, when the control section of the network facsimile apparatus determines that the first IP address and the second IP address coincide with each other, based on a comparison result of the comparing section, the control section conducts controlling operations so as to transmits the image data, transmission of which is currently suspended, to the second callee; and wherein, when the first callee currently enters in another state capable of establishing the session with the caller, the first control section of the first network facsimile apparatus conducts controlling operations so that the first callee calls the caller based on the IP address of the network facsimile apparatus, stored in the storage section, through the first network interface control section.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
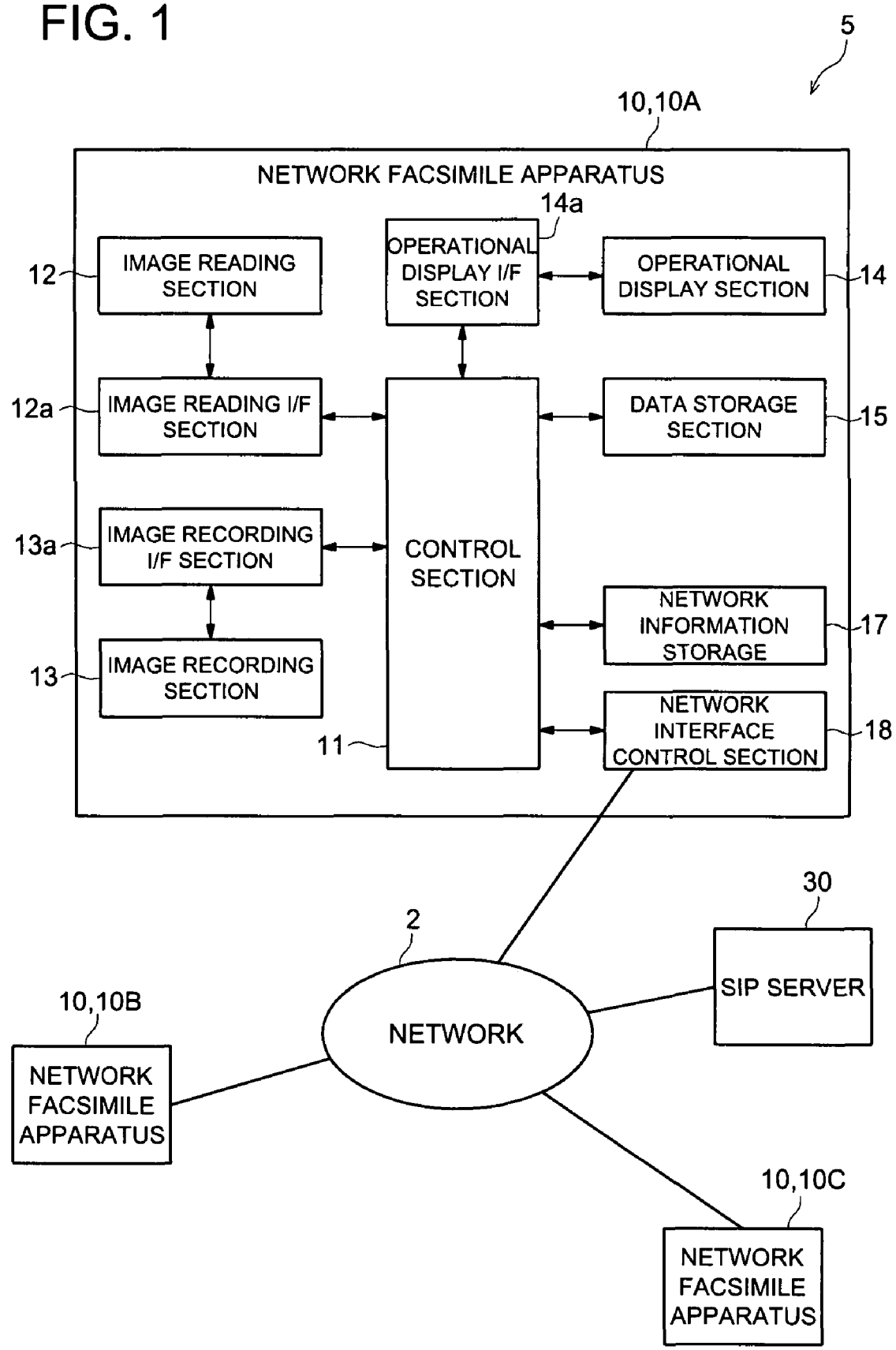
FIG. 1 shows an exemplified configuration of a network facsimile system including a network facsimile apparatus embodied in the present invention.

Referring to the drawings, the embodiment of the present invention will be detailed in the following.

FIG. 1 shows an exemplified configuration of a network facsimile system 5 including a network facsimile apparatus 10 embodied in the present invention. The network facsimile system 5 is such a facsimile communication system that is so constituted that the call connection (namely, the establishment of the session) is achieved by employing the Session Initiation Protocol, and facsimile image data are communicated between transmitters and receivers, which are coupled to each other in the peer-to-peer network architecture, through a network 2. The network facsimile system 5 is structured by connecting a SIP server 30 and a plurality of network facsimile apparatuses 10 to the network 2, such as the Internet, etc.

According to the Session Initiation Protocol, a SIP address (for instance, a FAX telephone number of the public telephone line, etc.) for specifying each of network facsimile apparatuses 10, installed in various sites, and its IP address (Internet Protocol address) are registered and stored into the SIP server 30, while correlating them with each other. The SIP server 30 is installed in the network 2 and constituted by a proxy server, a registration server, a location server, a redirect server, etc. Then, when the one of the network facsimile apparatuses 10, serving as a caller, requests an establishment of the call connection to the SIP server 30 with the SIP address of the destination, the SIP server 30 retrieves the IP address corresponding to the SIP address received from the network facsimile apparatus serving as the caller, in order to try to establish the call connection between the network facsimile apparatuses 10, which respectively serve as the caller and the callee. The establishment/finalization of the session in the Session Initiation Protocol is achieved by exchanging various kinds of methods and various kinds of responses corresponding to the methods between the caller and the callee.

Any one of the network facsimile apparatuses 10 serves as a network connectable facsimile apparatus that conducts a session controlling operation based on the Session Initiation Protocol, and is constituted by: a control section 11 including a CPU (Central Processing Unit) as its main section; an image reading section 12 for optically reading a document so as to acquire image data; an image recording section 13 for printing an image onto a recording medium; an operational display section 14 for displaying an operational screen and for receiving operations operated by the user; a data storage section 15 including data storages for storing the image data and a hard disc drive; a network information storage 17 for storing various kinds of information pertaining to the communications for which the Session Initiation Protocol is employed; a network interface control section 18 (hereinafter, referred to as a network I/F control section 18, for simplicity) having a function for exchanging various kinds of data between the SIP server 30 and other terminal devices through the network 2; etc.

Further, the image reading section 12, the image recording section 13 and operational display section 14 are coupled to the control section 11 through an image reading interface section 12a, an image recording interface section 13a and an operational display interface section 14a (hereinafter, respectively referred to as an image reading interface I/F section 12a, an image recording I/F section 13a and an operational display I/F section 14a, for simplicity), respectively.

Figure 2:
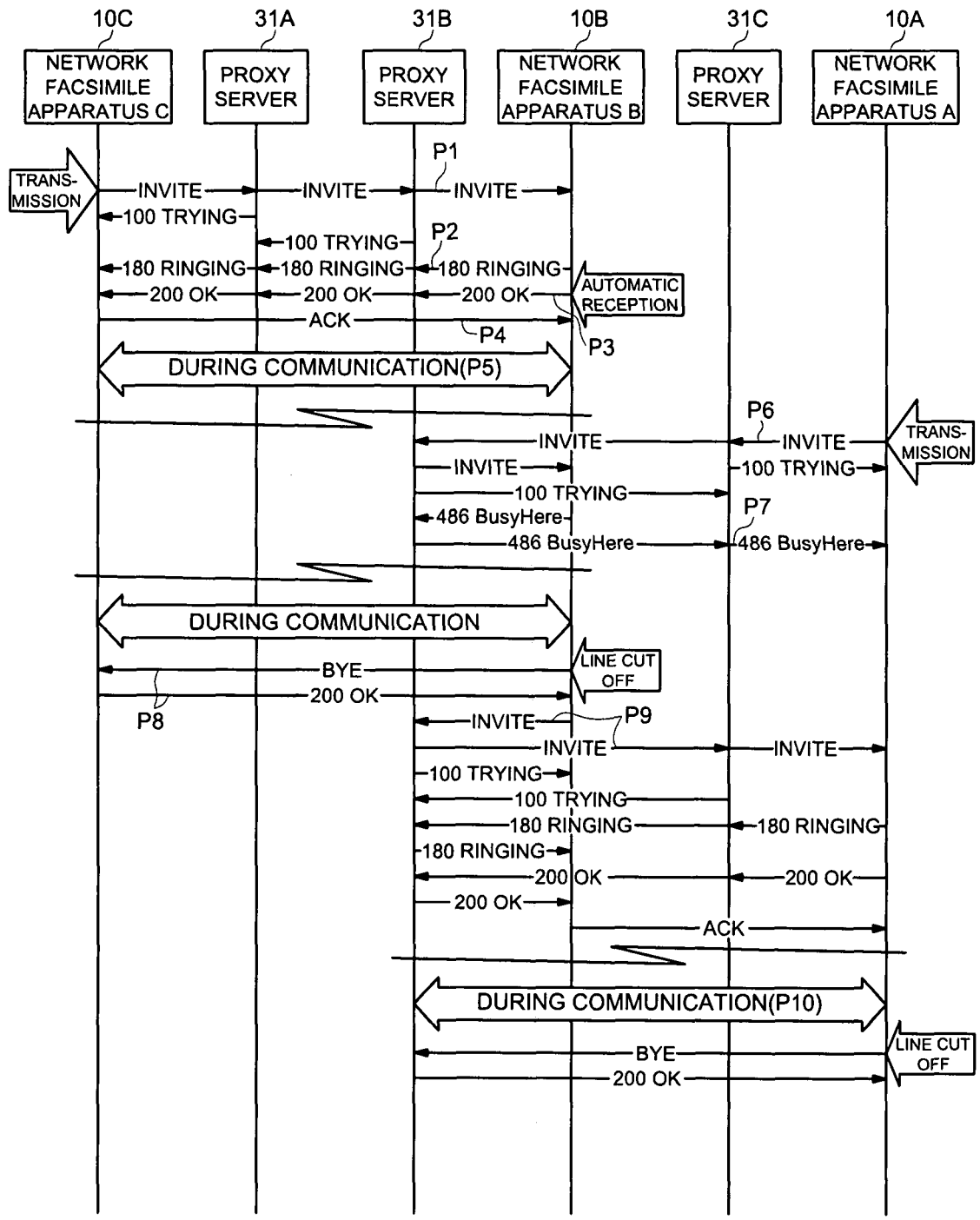
FIG. 2 shows a flowchart of whole communications to be conducted between network facsimile apparatuses when network facsimile apparatus 10A requests an establishment of a session to network facsimile apparatus 10B in a mid-course of an image data transmitting operation from network facsimile apparatus 10C to network facsimile apparatus 10B.

FIG. 2 shows a flowchart of communications to be conducted between the network facsimile apparatuses 10 when a network facsimile apparatus 10A requests the establishment of the session to a network facsimile apparatus 10B in a mid-course of an image data transmitting operation from a network facsimile apparatus 10C to a network facsimile apparatus 10B.

At first, the network facsimile apparatus 10C, serving as a caller at the sender site, sends the INVITE method to the network facsimile apparatus 10B, serving as a callee at the receiver site, so as to urge an establishment of the session concerned. The proxy server 31A and the proxy server 31B relay the INVITE method so that the INVITE method arrives in the network facsimile apparatus 10B (arrow P1 shown in FIG. 2). Further, each of the proxy server 31A and the proxy server 31B also sends a response code 100TRYING, indicating a current status of transferring the request to the following stage, back to the caller that originally sent the INVITE method received.

When receiving the INVITE method, the network facsimile apparatus 10B sends a response code 180RINGING back to the network facsimile apparatus 10C (arrow P2 shown in FIG. 2), and further, when it is in a receivable state, sends a response code 200OK back to the network facsimile apparatus 10C (arrow P3 shown in FIG. 2). The proxy server 31B and the proxy server 31A relay both the response code 180RINGING and the response code 200OK, so that those arrive in the network facsimile apparatus 10C. Receiving the response code 200OK, the network facsimile apparatus 10C sends the ACK method (arrow P4 shown in FIG. 2) directly to the network facsimile apparatus 10B. Then, the session between network facsimile apparatus 10C and the network facsimile apparatus 10B is established.

After the session is established, the facsimile transmission of the image data is conducted by employing an arbitral protocol (arrow P5 shown in FIG. 2). For instance, protocol conformity with the Recommendation T.37 or T.38 of ITU-T (International Telecommunication Union-Telecommunication sector) could be employed. In this example, the communication is conducted by employing the direct SMPT (Simple Mail Transfer Protocol).

When the network facsimile apparatus 10A requests the establishment of the session to the network facsimile apparatus 10B in mid-course of the image data transmitting operation from the network facsimile apparatus 10C to the network facsimile apparatus 10B (arrow P6 shown in FIG. 2), the proxy server 31A and the proxy server 31B relay the INVITE method issued by the network facsimile apparatus 10A so that the INVITE method arrives into the network facsimile apparatus 10B. However, since the network facsimile apparatus 10B is currently in a state incapable of receiving the image data sent from the network facsimile apparatus 10A due to its BUSY status, the network facsimile apparatus 10B sends the repose code 486BusyHere back to the network facsimile apparatus 10A in order to cut off the session (arrow P7 shown in FIG. 2).

When the reception of the image data sent from the network facsimile apparatus 10C is completed, the network facsimile apparatus 10B sends the BYE method to the network facsimile apparatus 10C. In response to the BYE method, the network facsimile apparatus 10C sends the response code 200OK back to the network facsimile apparatus 10B, serving as a callee. Then the transmission line is cut off and the session is opened (arrows P8 shown in FIG. 2).

In the conventional system, the network facsimile apparatus 10A, which recognized the BUSY status of the callee, would try to retransmit the image data after a predetermined time period has elapsed. However, in the example embodied in the present invention, the system is so constituted that the network facsimile apparatus 10B requests the establishment of the session to the network facsimile apparatus 10A (arrows P9 shown in FIG. 2) just after the communication with the network facsimile apparatus 10C is finalized and the capable state of receiving the image data is resumed, and then, the network facsimile apparatus 10C transmits the image data to the network facsimile apparatus 10B after the session is established (arrow P10 shown in FIG. 2).

Next, various kinds of communication sequences between the transmitter and the receiver will be detailed one by one in the following.

Figure 3:
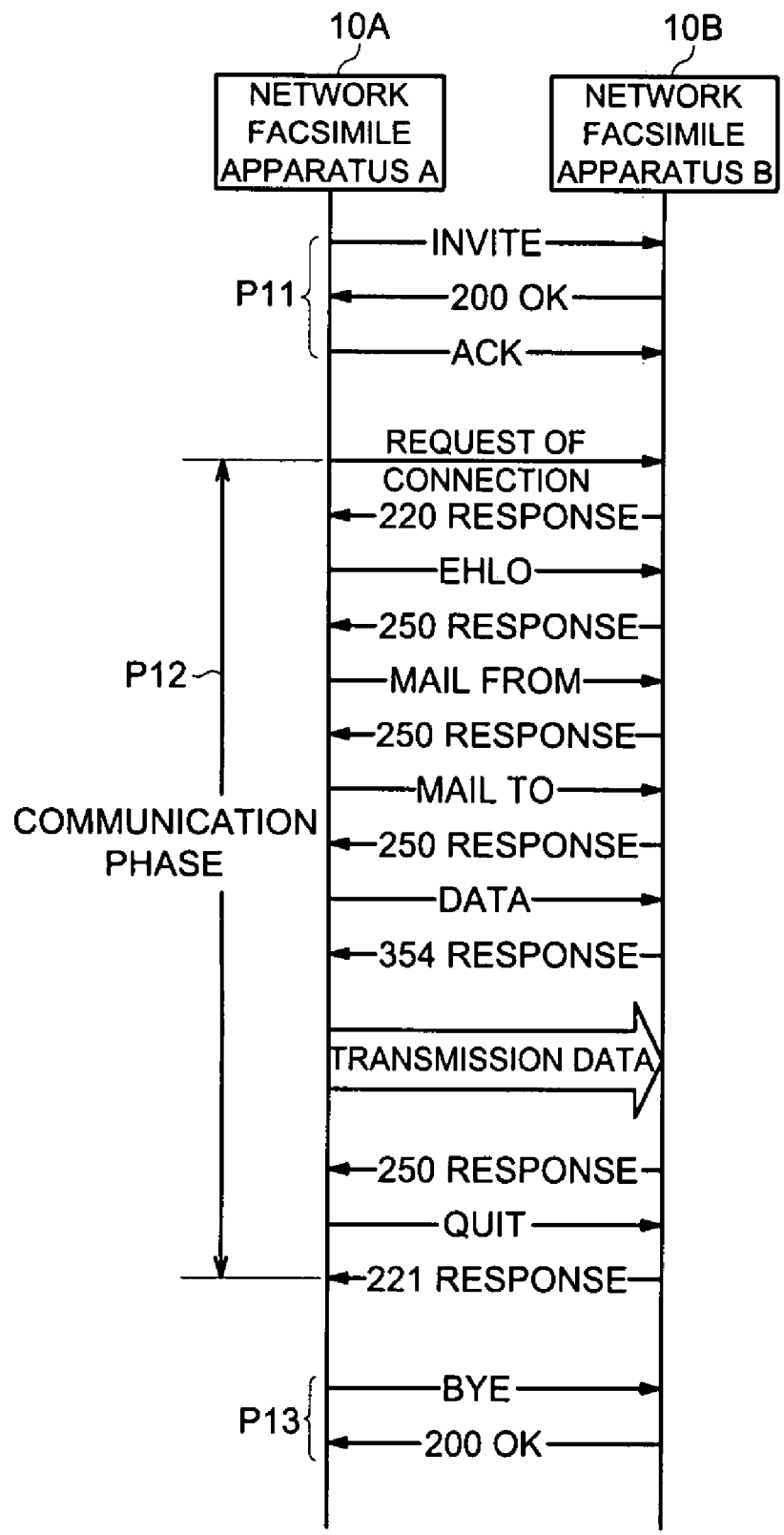
FIG. 3 shows an explanatory chart of communication sequences in a normal image data transmission.

FIG. 3 shows a communication sequence in a normal image data transmission. In response to the session establishment request (namely, INVITE method) sent from the network facsimile apparatus 10A to the network facsimile apparatus 10B, the network facsimile apparatus 10B sends the session establishment response (response code 200OK) back to the network facsimile apparatus 10A. Then, the network facsimile apparatus 10A sends the confirmation response (response code ACK) to the network facsimile apparatus 10B, so as to establish the session (arrows P11 shown in FIG. 3).

After that, the network facsimile apparatus 10A transmits the image data to the network facsimile apparatus 10B (arrows P12 shown in FIG. 3). In this example, the transmission of the image data is conducted according to the direct SMTP (Simple Mail Transfer Protocol). The details of communication procedure based on the SMTP are shown in the communication phases indicated by arrows P12 shown in FIG. 3. In order to conduct a plurality of image data transmitting operations in mid-course of establishing the session, the communication phases indicated by arrows P12 are repeatedly conducted.

When the transmission of the image data is completed, the network facsimile apparatus 10A issues the session open method (namely, BYE method) based on the Session Initiation Protocol, and the network facsimile apparatus 10B sends the response code 200OK back to the network facsimile apparatus 10A, so as to open the session (arrows P13 shown in FIG. 3).

Next, the operations in the case that the status of the callee is currently BUSY will be detailed in the following.

Figure 4:
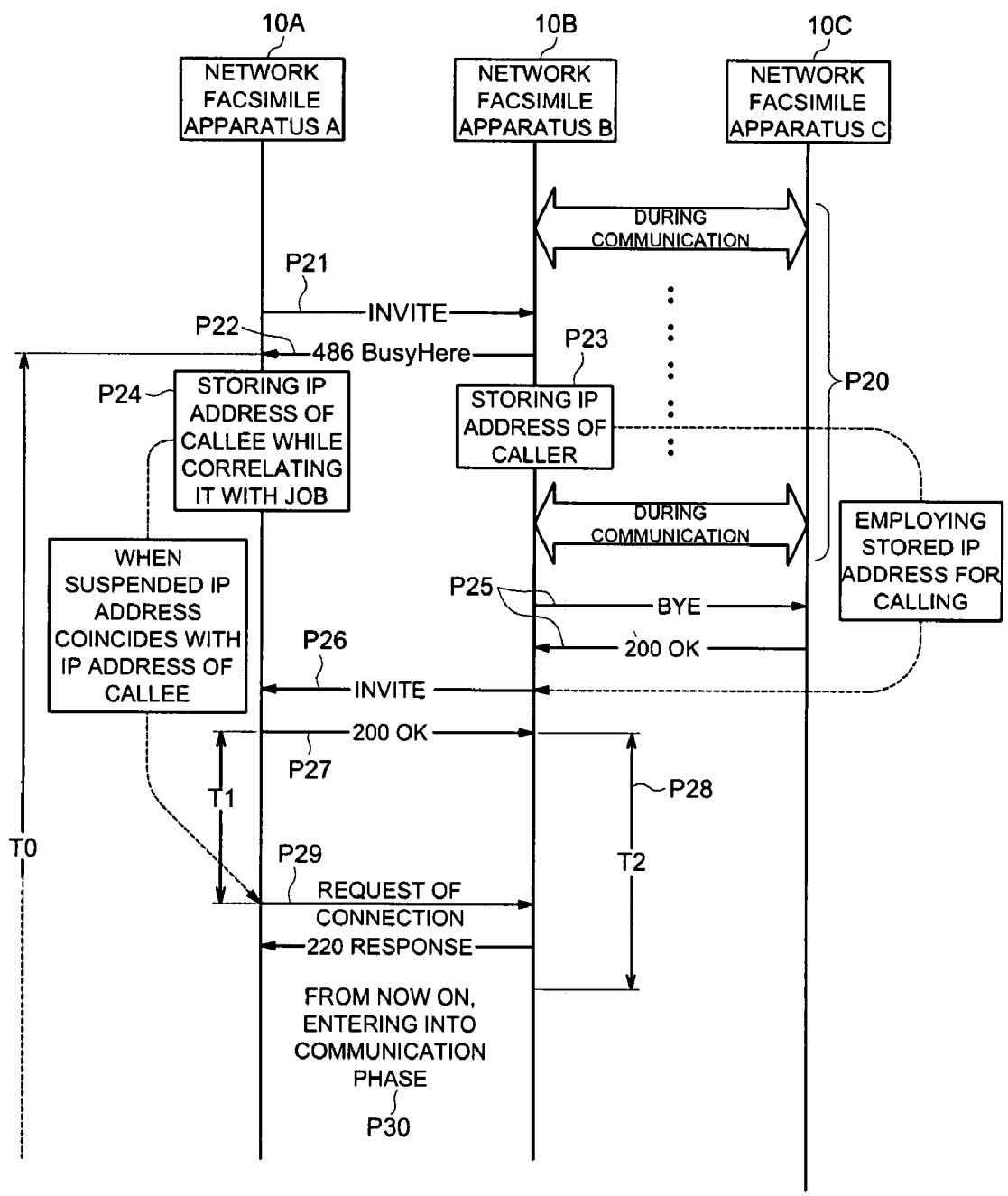
FIG. 4 shows an explanatory chart of communication sequences to be applied to such a case that network facsimile apparatus 10B sends the BUSY signal back to network facsimile apparatus 10A, when network facsimile apparatus 10A about to transmits facsimile data to network facsimile apparatus 10B.

FIG. 4 shows a communication sequence to be applied to such a case that the network facsimile apparatus 10B serving as a first callee sends the BUSY signal back to the network facsimile apparatus 10A serving as a caller, when the network facsimile apparatus 10A is about to transmit facsimile data to the network facsimile apparatus 10B. When the network facsimile apparatus 10A sends a request of establishing the session to the network facsimile apparatus 10B (arrow P21 shown in FIG. 4) in mid-course of the communicating operations currently performed between the network facsimile apparatus 10B and the network facsimile apparatus 10C (arrows P20 shown in FIG. 4), the network facsimile apparatus 10B determines that it is impossible to conduct operations for receiving the other image data due to the communicating operations currently performed, and accordingly, sends the response code 486BusyHere, indicating the impossibility of the communication, back to the network facsimile apparatus 10A (arrow P22 shown in FIG. 4). Incidentally, other than the above, the conditions for sending the BUSY response back, also includes such a case that a port to be used for transmitting the image data is currently occupied, a case that a sufficient memory area is not provided in the storage of the callee (NOT READY), etc.

At the same time when the network facsimile apparatus 10B sends the response code 486BusyHere back to the network facsimile apparatus 10A, the network facsimile apparatus 10B stores the IP address of the network facsimile apparatus 10A (namely, the IP address of the caller to which the signal indicating the impossibility of the communication is sent) into the network information storage 17, etc., (block P23 shown in FIG. 4).

When the network facsimile apparatus 10A serving as the caller receives the response code 486BusyHere, the caller suspends the operation for transmitting the image data, and at the same time, stores the IP address of the first callee (network facsimile apparatus 10B) and the job concerned to the current transmission into a working memory of the data storage section 15 shown in FIG. 1, while correlating them with each other (block P24 shown in FIG. 4), so as to enter into a status of waiting the retransmission from the callee. A time interval T0 for waiting the retransmission is set at, for instance, three minutes. Further, if the image data to be transmitted are not stored in the caller side, the network facsimile apparatus 10A stores the image data in it.

When the communication with the network facsimile apparatus 10C is completed (arrow P25 shown in FIG. 4), the network facsimile apparatus 10B serving as the first callee requests the establishment of the session to the caller (herein, network facsimile apparatus 10A) by using the IP address of the caller (arrow P26 shown in FIG. 4). Through this request of establishing the session, the first callee inquires presence or absence of the suspended image data to be transmitted to the callee from the network facsimile apparatus 10A, in order to request the caller to transmit the suspended image data to the callee itself (herein, network facsimile apparatus 10B) if such the suspended image data to be transmitted to the callee are currently stored in the caller. For this purpose, the network facsimile apparatus 10B enters into the waiting status of a predetermined time interval T2 (for instance, 60 seconds), without requesting the call connection based on the SMTP even after the session is established (arrow P28 shown in FIG. 4).

When the network facsimile apparatus 10A serving as the caller receives the request of establishing the session (received call, indicated by arrow P26 shown in FIG. 4), the caller determines whether or not it is possible to receive the image data in the current status. When determining that it is possible to receive the image data, the caller sends the session confirmation response back to the callee (arrow P28 shown in FIG. 4), and once enters into a mode of waiting the reception of the image data. After that, when the image data are not transmitted to the caller even after the predetermined time interval T1 (for instance, 30 seconds) has elapsed, the caller determines that the currently received call is a request of transmitting the image data reserved in the caller. Successively, the caller compares the IP address of the first callee, which was stored at block P24 shown in FIG. 4 and correlated with the job whose transmission is currently suspended, with that of the second callee, which is received in the currently received call (the request of establishing the session, indicated by arrow P26 shown in FIG. 4). When both the IP addresses coincide with each other, the caller sends the request of connection in respect to the transmission phase of the image data to the second callee (network facsimile apparatus 10B, and indicated by arrow P29 shown in FIG. 4), so as to transmits the image data.

Receiving the request of connection from the caller before the time interval T2 has elapsed, the network facsimile apparatus 10B receives the image data in response to the request of connection (as indicated by P30 shown in FIG. 4).

In this connection, when plural jobs are reserved, such as the case that a transmission reserved job, etc. exist, it is applicable that the transmissions of the image data are conducted by commencing the request of connection again.

When the caller receives the request of connection from the callee and the image data are transmitted from the callee before the time interval T1 has elapsed, the network facsimile apparatus 10A determines that the above transmission is a normal image data transmitting operation to be conducted by the calling side, and accordingly, receives the image data (same operation conducted by the network facsimile apparatus 10B shown in FIG. 3).

Figure 5:
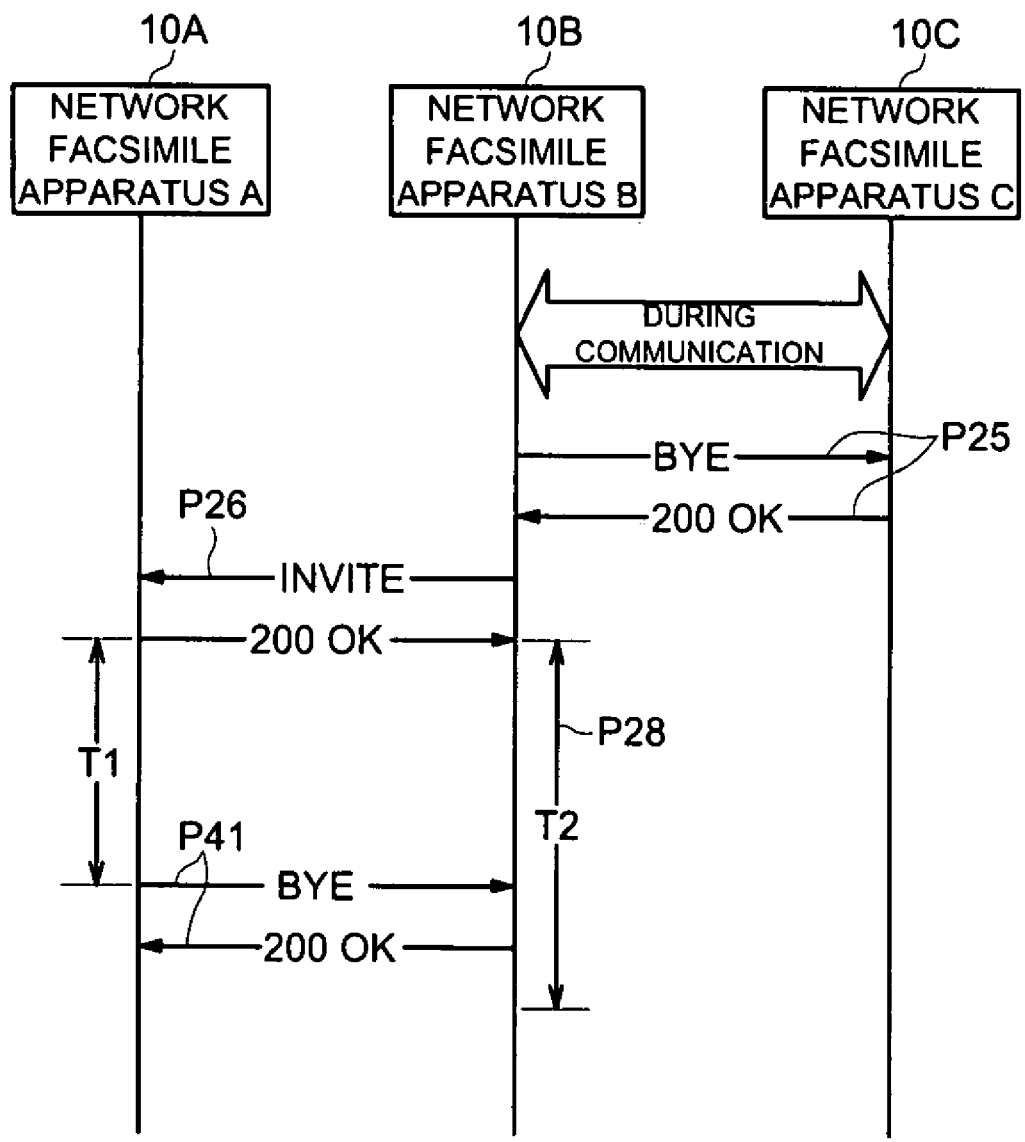
FIG. 5 shows an explanatory chart of communication sequences to be applied to such a case that network facsimile apparatus 10A opens the session due to a mismatch of IP address, etc., when the network facsimile apparatus 10A receives a request for transmitting reserved image data.

On the other hand, even when the image data has not been transmitted after the time interval T1 has elapsed, in case that the IP address of the first callee, which was stored at block P24 shown in FIG. 4 and correlated with the job whose transmission is currently suspended, does not coincide with that of the second callee, which is received in the currently received call (the request of establishing the session, indicated by arrow P26 shown in FIG. 4), in case that there is no IP address in regard to the suspended job, or in case that the suspended job is already deleted due to the fact that a number of retransmission times of the suspended job exceeds the predetermined number, the session is opened as shown in FIG. 5 (arrows P41 shown in FIG. 5).

Further, it is applicable that a message of suspending the transmission to a callee is displayed on the operational display section 14 (shown in FIG. 1), so as to make it possible to cancel the transmission of the suspended job designated by the user. Even when the above cancellation is made, the controlling operation for opening the session is conducted (arrows P41 shown in FIG. 5).

Figure 6:
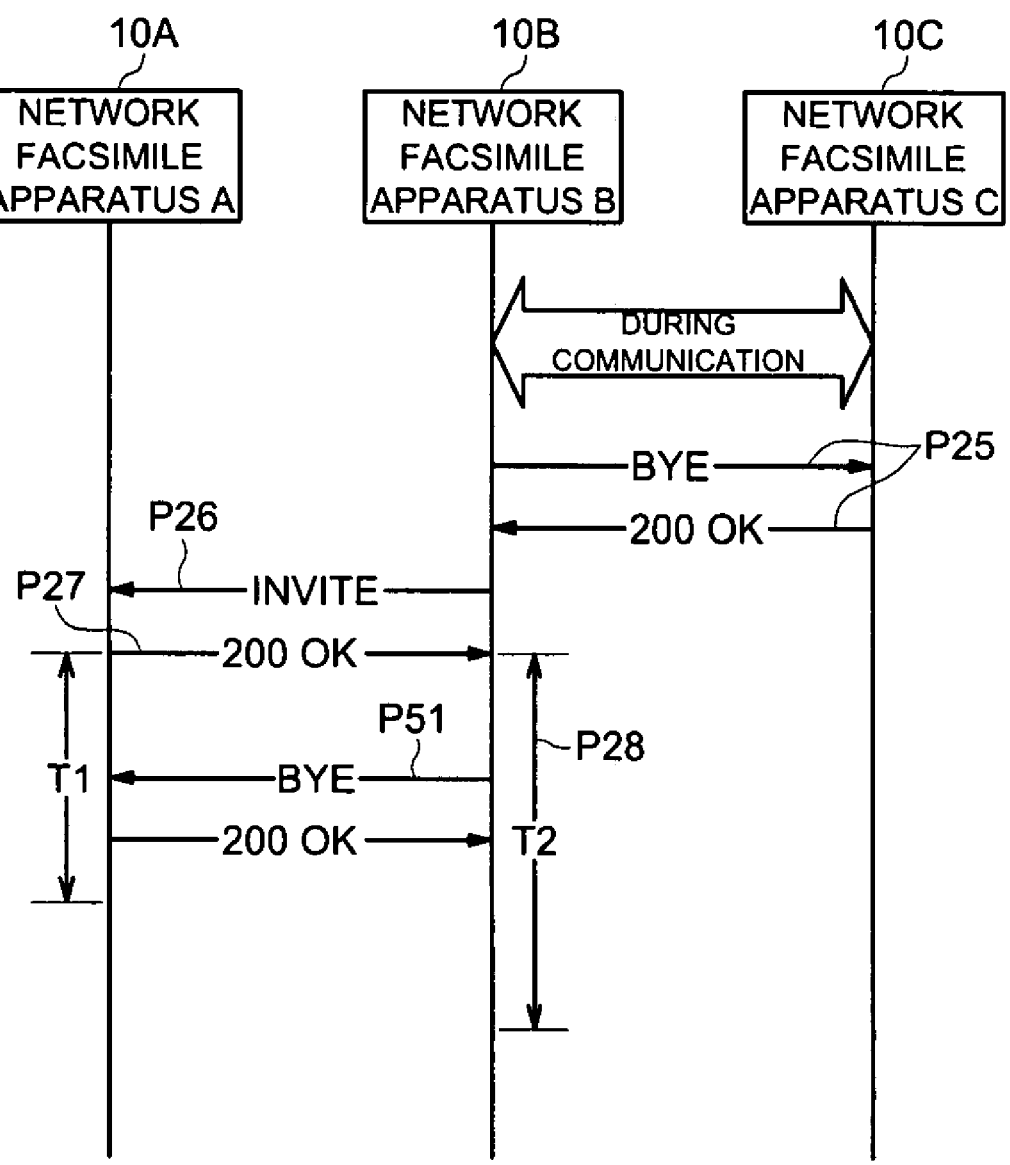
FIG. 6 shows an explanatory chart of communication sequences to be applied to such a case that network facsimile apparatus 10A receives a request for opening the session from network facsimile apparatus 10B before a reception waiting timer (T1) is time-up.

Still further, as shown in FIG. 6, when the network facsimile apparatus 10B cancels the communication before the time interval T1 has elapsed (arrow P51 shown in FIG. 6), the network facsimile apparatus 10A opens the session.

Figure 7:
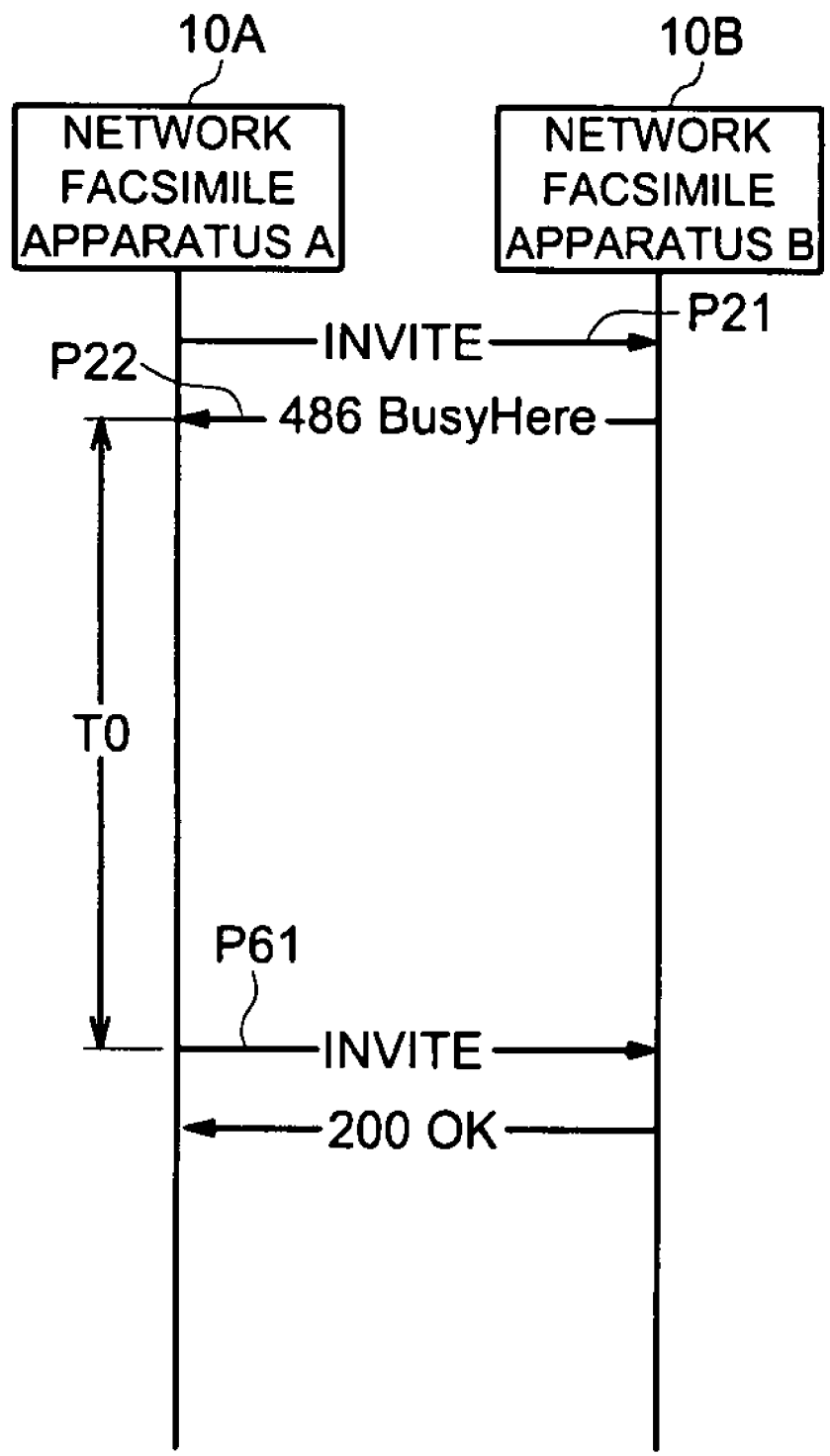
FIG. 7 shows an explanatory chart of communication sequences to be applied to such a case that network facsimile apparatus 10A recalls network facsimile apparatus 10B when a retransmission waiting timer (T0) is time-up.

Still further, in the case that no action is conducted (none of a transmitting operation of the reserved image data, a cancellation of the job, etc. is conducted) even after the time interval T0 has elapsed since the caller entered into a state of waiting the retransmission of the image data, the network facsimile apparatus 10A requests the establishment of the session to the network facsimile apparatus 10B (arrow P61 shown in FIG. 7), in order to retry the transmission of the image data to the callee.

Figure 8:
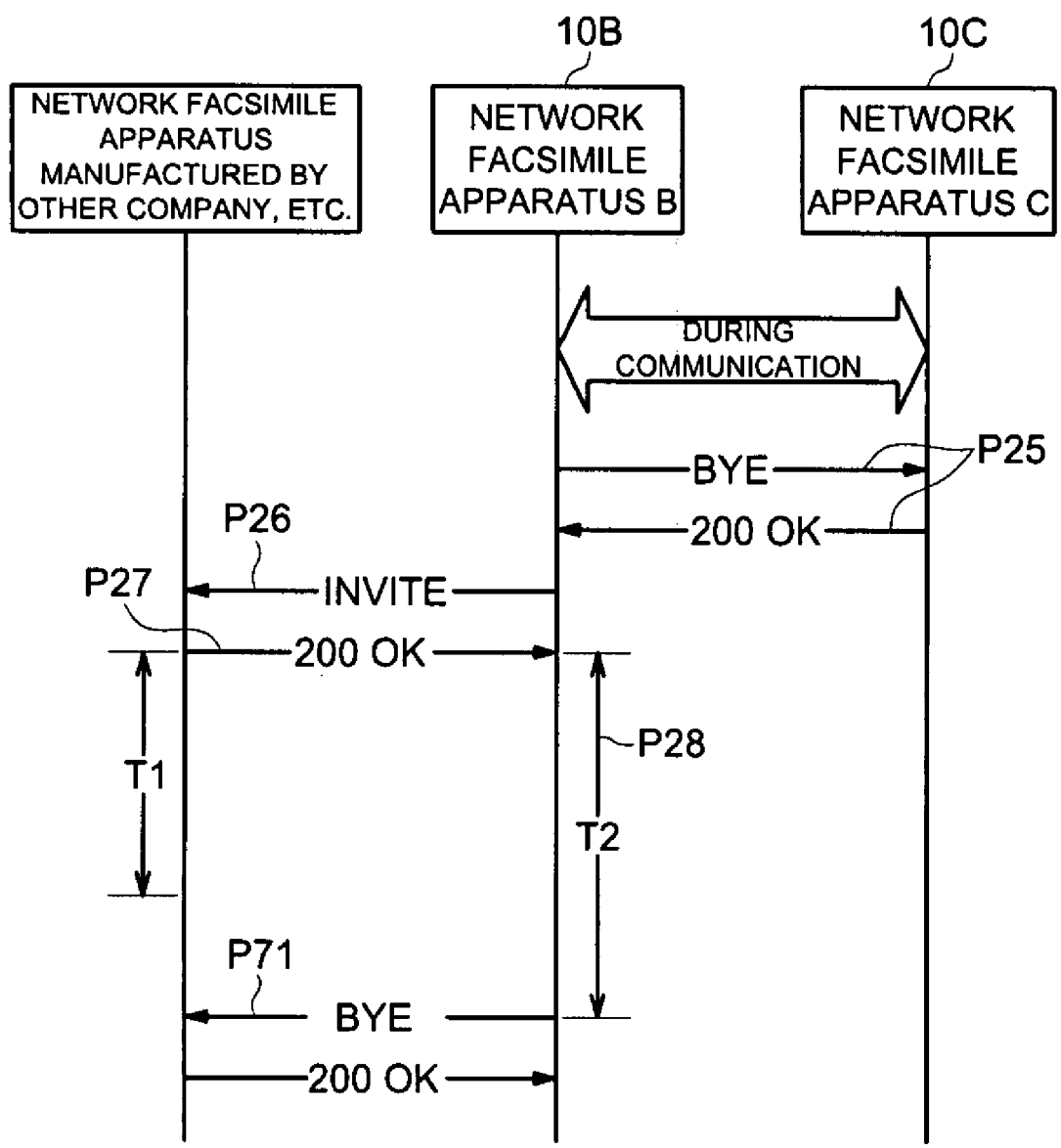
FIG. 8 shows an explanatory chart of communication sequences to be applied to such a case that network facsimile apparatus 10B receives nothing even after connection request waiting timer (T2) is time-up, though network facsimile apparatus 10B sent a transmission request of reserved image data.

Still further, as shown in FIG. 8, the network facsimile apparatus 10B serving as a first callee requests the establishment of the session to the caller who called the network facsimile apparatus 10B in mid-course of the communication between network facsimile apparatus 10B and network facsimile apparatus 10C (arrow P26 shown in FIG. 4), after the communication with the network facsimile apparatus 10C is completed (arrow P25 shown in FIG. 4). In this case, if the network facsimile apparatus 10B receives nothing even after the time interval T2 has elapsed since the above session is established, the network facsimile apparatus 10B itself issues the request for opening the session so as to open the session (arrow P71 shown in FIG. 8). When the caller ia an apparatus which does not issue such the response as indicated by the arrow P29 shown in FIG. 4 (for instance, an apparatus manufactured by the other company), the abovementioned sequence could be applied to such the case.

Figure 9:
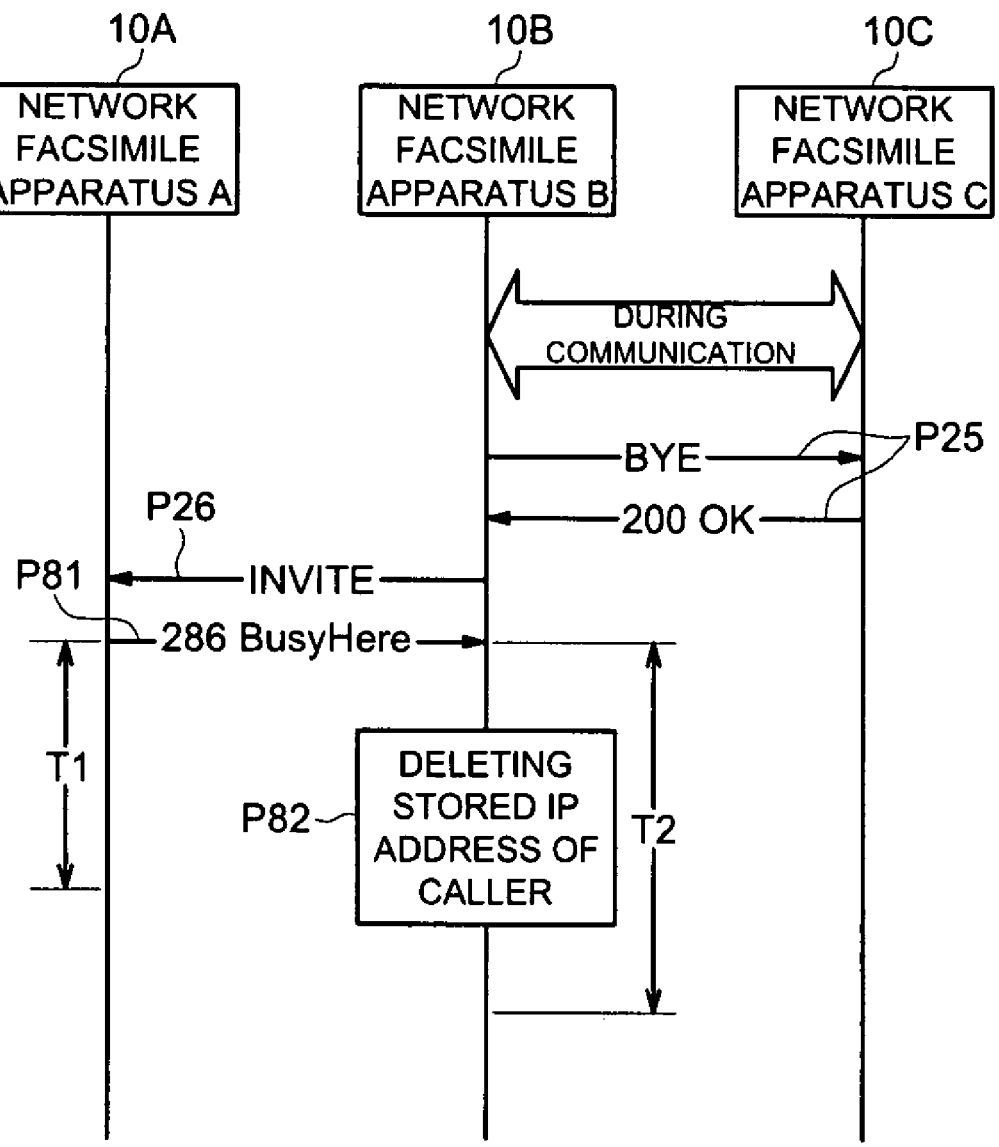
FIG. 9 shows an explanatory chart of communication sequences to be applied to such a case that a BUSY status signal is sent back to network facsimile apparatus 10B, though network facsimile apparatus 10B sent a transmission request of reserved image data.

Still further, as shown in FIG. 9, when the network facsimile apparatus 10B, serving as the first callee, requests the establishment of the session by employing the IP address of the caller, currently stored in the network information storage 17, (arrow P26 shown in FIG. 4) and then, the caller sends the BUSY status back to the first callee in response to the above request (arrow P81 shown in FIG. 9), the network facsimile apparatus 10B deletes the IP address of the caller stored in the network information storage 17, so as not to recall the caller hereafter, and to leave it to the controlling actions to be conducted by the transmitter side (herein, network facsimile apparatus 10A serving as the original caller). According to the above, since the transmission request of the image data is not again sent to the same caller, it becomes possible to prevent the network facsimile apparatus from conducting the complicated controlling operations and duplicate calling actions.

Next, referring to the flowchart shown in FIG. 10, the transmitting operations to be conducted by the network facsimile apparatus 10A will be detailed in the following.

Figure 10:
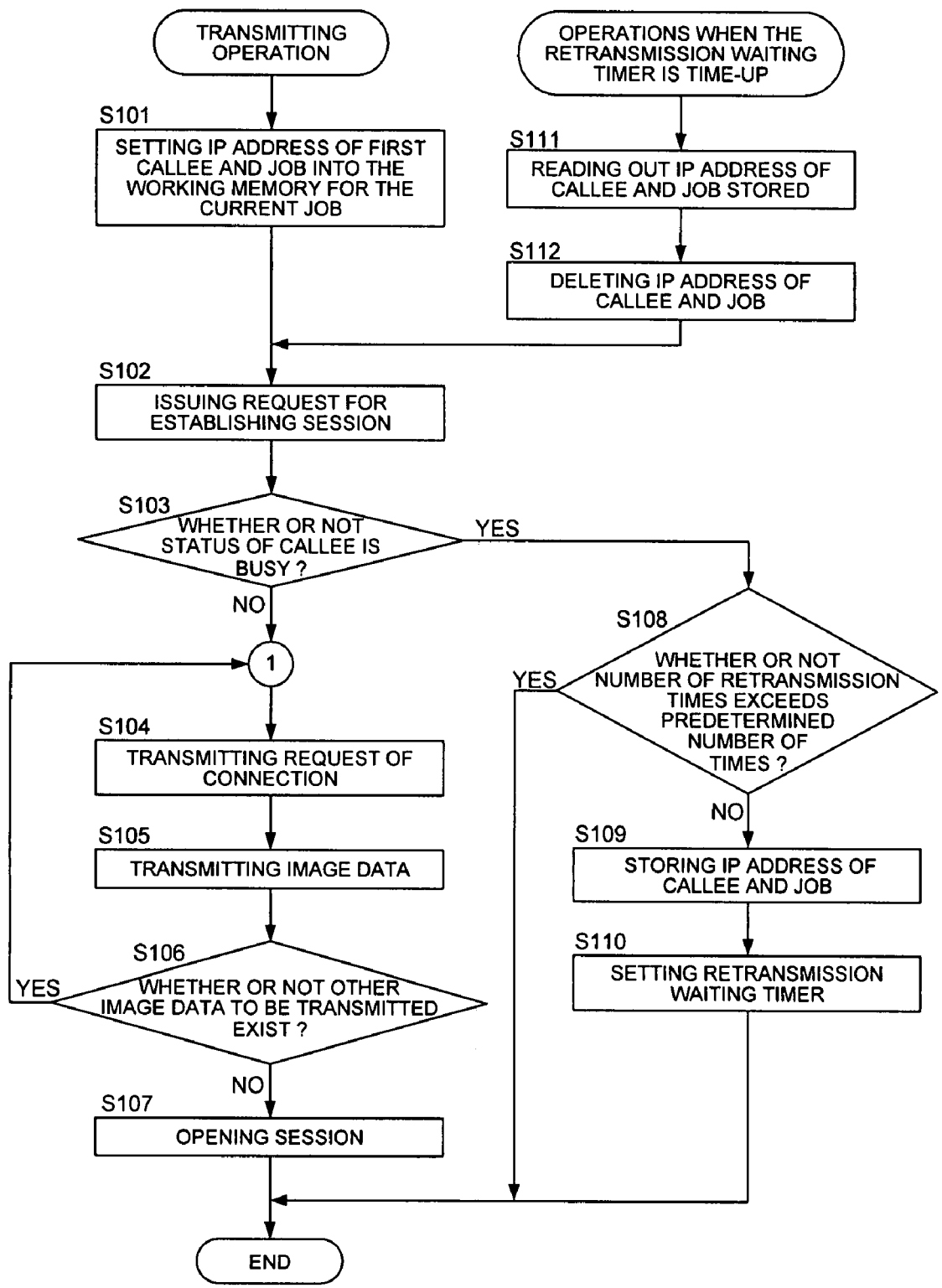
FIG. 10 shows a flowchart of transmitting operations to be conducted by network facsimile apparatus 10A.

As shown in FIG. 10, the flowchart of the transmitting operations to be conducted by the network facsimile apparatus 10A includes the steps of: setting the IP address of the first callee and the job data representing the contents, the settings, etc. of the transmitting job, to be currently implemented, into the working memory for the current job (Step S101); issuing the request for establishing the session through the network interface control section 18 (Step S102); determining whether or not the status of the callee is BUSY, which indicates an incapable state of the communication (Step S103); establishing the session and transmitting the request of the call connection in regard to the transmission of the image data (herein, the request of the call connection is based on the SMTP) (Step S104), when determining that the status of the callee is not BUSY (Step S103; No); transmitting the image data just after the call connection is established (Step S105); determining whether or not other image data to be transmitted exist (Step S106); conducting the communication phases (Step S104, Step S105) again, when determining that other image data to be transmitted still exist (Step S106; Yes); and opening the session to finalize the processing (Step S107), when determining that other image data to be transmitted do not exist (Step S106; No).

On the other hand, the flowchart of the transmitting operations to be conducted by the network facsimile apparatus 10A further includes the steps of: determining whether or not a number of retransmission times exceeds a predetermined number of times (for instance, three times) (Step S108), when determining that the status of the callee is BUSY (Step S103; Yes); finalizing the processing, when determining that the number of retransmission times exceeds the predetermined number of times (Step S108; Yes); storing the IP address of the callee and the job data (Step S109) when determining that the number of retransmission times does not exceed the predetermined number of times (Step S108; No); and setting a retransmission waiting timer at time interval T0 (Step S110), so as to temporarily finalize the processing. Incidentally, when the image data to be transmitted are not stored in the network facsimile apparatus 10A, the concerned image data are stored in the network facsimile apparatus 10A.

The flowchart of the transmitting operations to be conducted by the network facsimile apparatus 10A further includes the steps of: reading out the IP address of the callee and the job data stored in Step S109 so as to set them into the working memory of the current job (Step S111), when the retransmission waiting timer is time-up (or time interval T0 has elapsed, in the case indicated by FIG. 7); deleting the IP address of the callee and the job data from the original storage (Step S112); and entering into Step S102, so as to implement the operations in regard to the retransmission of the image data. Incidentally, although the IP address of the callee and the job data are deleted in Step S112 of the above example, it is also applicable that the IP address of the callee and the job data are deleted at the time when the session is opened in Step S107 after the transmission of the image data has been completed, instead of deleting them in the Step S112.

Next, referring to the flowchart shown in FIG. 11, the operations to be conducted by the network facsimile apparatus 10B when its status changes from the unreceivable state to the receivable state will be detailed in the following.

Figure 11:
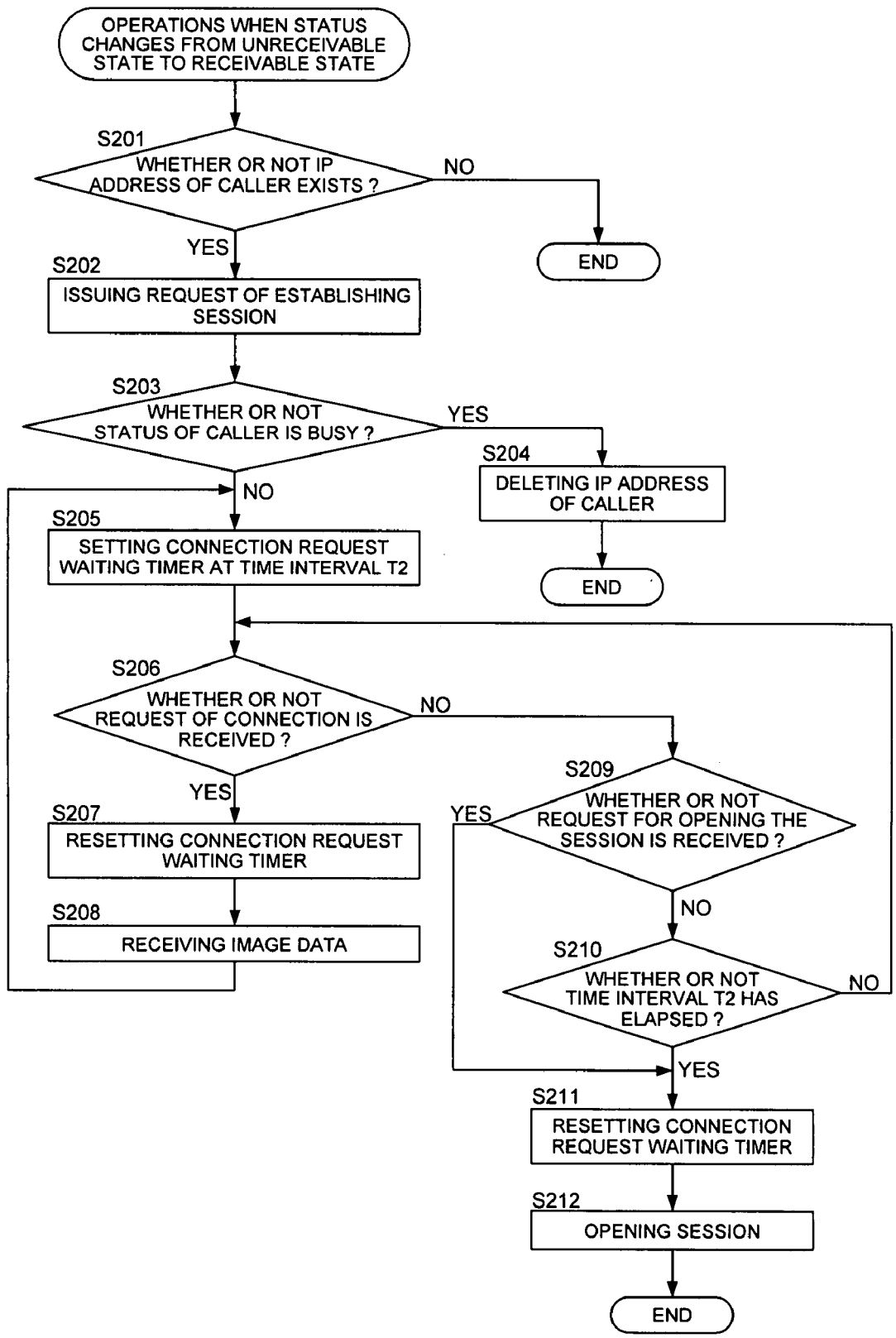
FIG. 11 shows a flowchart of operations to be conducted by network facsimile apparatus 10B when its status changes from an unreceivable state to a receivable state.

As shown in FIG. 11, the flowchart of the operations to be conducted by the network facsimile apparatus 10B includes the steps of: investigating presence or absence of the caller to which the response code of BUSY status (namely, the communication incapable signal) was sent back during the unreceivable state of the callee, or concretely speaking, determining whether or not the IP address of the caller (to be stored in block P23 shown in FIG. 4) is stored in the predetermined area of the network information storage 17 (Step S201); finalizing the processing when determining that the caller to which the response code of BUSY status was sent back does not exist (Step S201; No); issuing a request of establishing the session with the caller (Step S202) when determining that the caller to which the response code of BUSY status was sent back exists (Step S201; Yes); determining whether or not the status of the caller is BUSY (Step S203); and deleting the IP address of the caller from the network information storage 17 (Step S204) so as to finalize the processing, when determining that the status of the caller is BUSY (Step S203; Yes). This is equivalent to the operations conducted by the network facsimile apparatus 10B shown in FIG. 9.

The flowchart of the operations to be conducted by the network facsimile apparatus 10B further includes the steps of: setting a connection request waiting timer at time interval T2 (Step S205) after the session is established, when determining that the status of the caller is not BUSY (Step S203; No); monitoring whether or not the request of call connection in respect to the transmission of the image data is received from the caller (Step S206) and whether or not the request for opening the session is received from the caller (Step S209), during the time interval until the connection request waiting timer is time-up (or, time interval T2 has elapsed) (Step S210); resetting the connection request waiting timer (Step S207) to implement the operation for receiving the image data (Step S208), when the request of call connection is received before the connection request waiting timer is time-up (Step S206; Yes); again setting the connection request waiting timer at time interval T2, in order to cope with such a case that the caller continuously transmits plural sets of image data for plural times; and opening the session (Step S212) after resetting the connection request waiting timer (Step S211), when the request of opening the session is received (namely, the response code BYE is received from the caller) before the connection request waiting timer is time-up (Step S209; Yes), or when the connection request waiting timer is time-up (Step S210; Yes). Incidentally, the abovementioned session is opened by transmitting the response code BYE to the caller from the callee when the connection request waiting timer is time-up (corresponding to the case shown in FIG. 8), while the abovementioned session is opened by sending the response code 200OK back to the caller from the callee when the request of opening the session is received (corresponding to the case shown in FIG. 5).

Next, referring to the flowchart shown in FIG. 12, the operations to be conducted by the network facsimile apparatus 10A, when the network facsimile apparatus 10A, being the original caller, receives the request for establishing the session will be detailed in the following.

Figure 12:
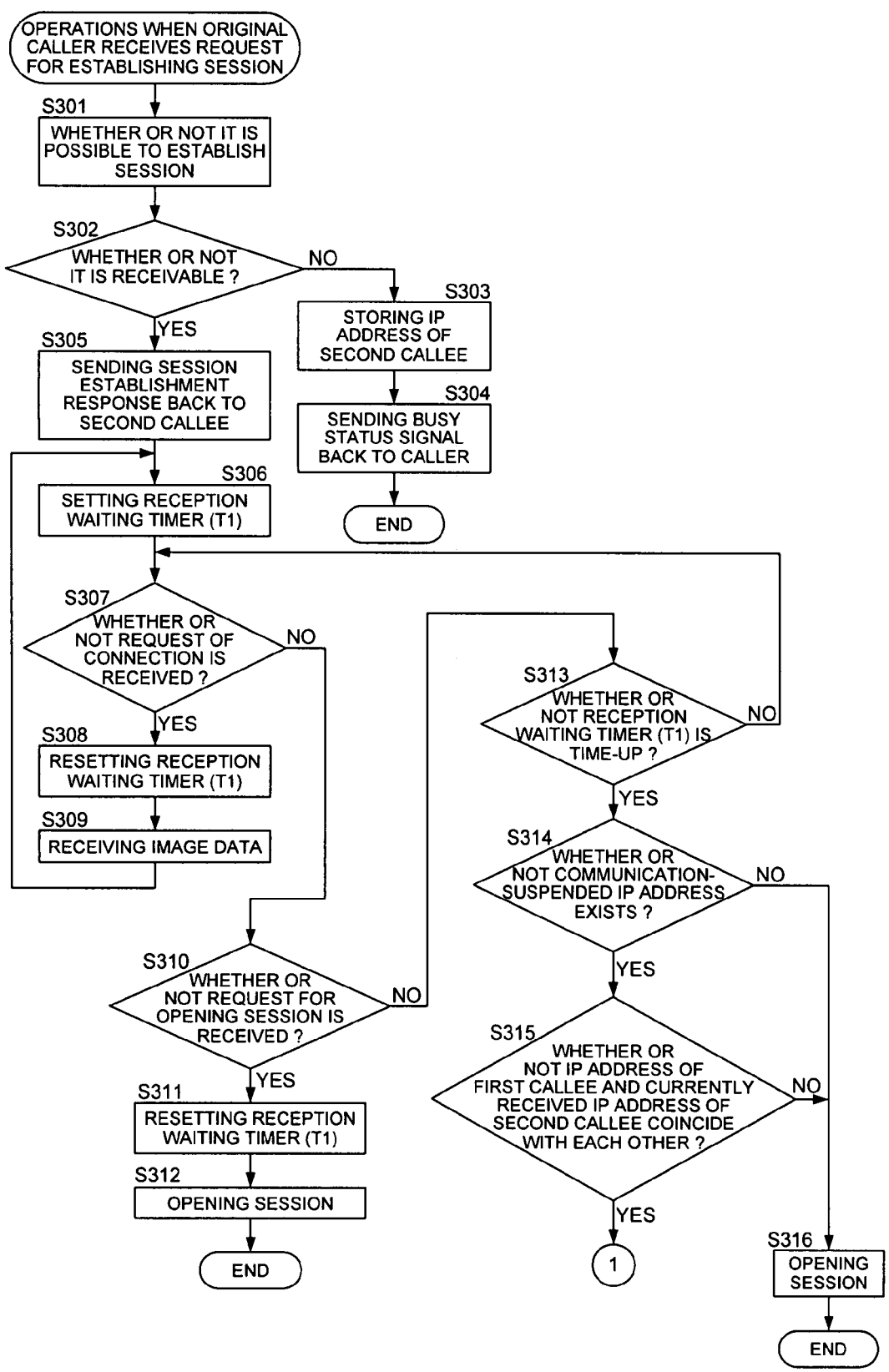
FIG. 12 shows a flowchart of operations to be conducted by network facsimile apparatus 10A, when network facsimile apparatus 10A receives a request for establishing a session.

As shown in FIG. 12, the flowchart of the operations to be conducted by the network facsimile apparatus 10A includes the steps of: determining whether or not it is possible to establish the session (Step S301), when the caller receives the request for establishing the session through the network interface control section 18 from the second callee; and storing the IP address of the second callee (Step S303) and sending the BUSY status signal (communication incapable signal) back to the caller (Step S304) to finalize the processing, when determining that it is impossible to establish the session, for instance, due to the fact that it is impossible to receive the image data since the second callee is in mid-course of communicating with another network facsimile apparatus (Step S302; No). The abovementioned steps are similar to the operations indicated by the arrows P21, P22 and P23 to be conducted by the network facsimile apparatus 10B, shown in FIG. 4.

The flowchart of the operations to be conducted by the network facsimile apparatus 10A further includes the steps of: sending the session establishment response back to the second callee through the network interface control section 18 (Step S305), when the second callee is in a receivable state (Step S302; Yes); monitoring whether or not the request of call connection in respect to the transmission of the image data is received from the second callee (Step S307) and whether or not the request for opening the session is received from the second callee (Step S310), during the time interval until the reception waiting timer is time-up (or, time interval T1 has elapsed) (Step S313; No); entering into the normal communication phase as shown in FIG. 3, when the request of call connection is received before the reception waiting timer is time-up (or, time interval T1 has elapsed); resetting the reception waiting timer (T1) (Step S308); conducting the operation for receiving the image data (Step S309); and setting the reception waiting timer (T1) again (Step S306), in order to cope with such a case that the caller continuously transmits plural sets of image data for plural times.

The flowchart of the operations to be conducted by the network facsimile apparatus 10A further includes the steps of: opening the session (Step S312) after resetting the reception waiting timer (T1) (Step S311), when the request of opening the session is received (namely, the response code BYE is received from the second callee) before the reception waiting timer (T1) is time-up (Step S310; Yes, the case shown in FIG. 6); investigating whether or not the IP address correlated to the job whose transmission is currently suspended is stored (presence or absence of the image data set whose transmission is currently suspended) (Step S314), when the reception waiting timer (T1) is time-up (Step S313; Yes) and when determining that the current call is the request of transmitting the image data whose transmission is suspended; opening the session (Step S316, the case shown in FIG. 5) when the IP address correlated to the suspended job concerned does not exist (Step S314; No); comparing the IP address of the first callee with the currently received IP address of the second callee in regard to the suspended job concerned, when the IP address correlated to the suspended job concerned exists in the storage (Step S314; Yes); opening the session (Step S316, the case shown in FIG. 5) when the IP address of the first callee and the currently received IP address of the second callee do not coincide with each other (Step S315; No); entering into Step S104 shown in FIG. 10 when the both IP addresses coincide with each other (Step S315; Yes); and conducting the operation for transmitting the reserved image data to the second callee (the case indicated by arrow P29 shown in FIG. 4).

As described in the foregoing, in the case that the transmitting operation of the image data is suspended due to the BUSY status of the receiver side, etc., it is the receiver side that calls the transmitter side at the time when the BUSY status of the receiver side is eliminated, in order to request the transmission of the image data reserved in the transmitter side. Accordingly, it becomes possible to quickly complete the transmitting operation of the reserved image data, compared to such the case that the transmitter side calls the receiver side again after the retransmission waiting time interval T2 has elapsed.

Specifically, since the time period required for transmitting the image data in the network facsimile system tends to be shortened, compared to that in the facsimile apparatus utilizing the public telephone line, the BUSY status of the receiver side could be quickly eliminated within a short time period. Accordingly, the above-mentioned advantageous effect becomes considerable in the network facsimile system.

Further, since the connection request waiting timer (T2) and the reception waiting timer (T1) are employed for achieving the operation for transmitting the transmission request for the reserved image data without introducing specific signals, it becomes possible not only to keep a compatibility with a network facsimile apparatus working on the standard procedures without generating any abnormality between the caller and the callee, but also to secure the versatility as the network facsimile apparatus.

Although the preferred embodiments of the present invention have been described in the foregoing, the scope of the present invention is not limited to the embodiments aforementioned. Modifications or additions applied to the disclosed embodiments by a skilled person without departing from the spirit and scope of the invention shall be included in the scope of the present invention.

Further, although the time intervals T0, T1 and T2 are set at 3 minutes, 30 seconds and 60 seconds, respectively, in the aforementioned embodiments, each of the above time intervals can be set at an arbitral value other than the above, as far as the relationship of T2>T1 is fulfilled. Specifically, the time interval T0 can be set at an arbitral value, independently of T2 and T1.

According to the network facsimile apparatus embodied in the present invention, since it is possible for the transmitter to commence the transmitting operation of the reserved image data, transmission of which is currently suspended due to the BUSY status of the receiver, in response to the calling action sent from the receiver to the transmitter, it becomes possible to quickly complete the transmitting operation of the reserved image data, for instance, by calling the transmitter when the receiver enters into the receivable state, to notify the transmitter of the fact that the receiver is currently in the receivable state.

Further, since, when the image data are not transmitted even after the predetermined time interval has elapsed, the callee determines that the current call is a transmission request of the reserved image data, sent from the caller, it becomes possible to realize the function for transmitting the reserved image data on the basis of the calling action of the receiver, within a range of the standard procedures of the Session Initiation Protocol without adding any specific signal. Accordingly, it becomes possible to maintain the versatility as the network facsimile apparatus.

While the preferred embodiments of the present invention have been described using specific term, such description is for illustrative purpose only, and it is to be understood that changes and variations may be made without departing from the spirit and scope of the appended claims.

What is claimed is:

1. A network facsimile apparatus, serving as a caller that establishes a session based on a Session Initiation Protocol to conduct image data communicating operations with other apparatuses serving as callees, comprising:
   a control section to suspend an operation for transmitting image data to a first callee when the first callee sends a communication incapable signal back to the caller in response to a session establishment request directed to the first callee and originally issued by the caller;
   a storage section to store a first IP address of the first callee; and
   a network interface control section that receives a session establishment request sent from a second callee and then, sends a session establishment response back to the second callee;
   wherein the control section compares the first IP address of the first callee, stored in the storage section, with a second IP address of the second callee, when image data is not transmitted to the caller from the second callee within a predetermined time interval after the session establishment response has been sent back to the second callee; and
   wherein, when the control section determines that the first IP address and the second IP address coincide with each other the control section deems the same apparatus to be serving as both the second callee and the first callee, and conducts controlling operations so as to transmit the image data, transmission of which is currently suspended, to the second callee.

2. The network facsimile apparatus of claim 1,
   wherein, when the control section determines that the first IP address and the second IP address do not coincide with each other, the control section opens the session established in respect to the second callee.

3. The network facsimile apparatus of claim 2,
   wherein the control section deletes the second IP address stored in the storage section at a same time when the control section opens the session in respect to the second callee.

4. The network facsimile apparatus of claim 1,
   wherein, when image data are not transmitted to the caller from the second callee within the predetermined time interval after the session establishment response is sent back to the second callee and none of image data to be transmitted are reserved in the caller itself, the control section opens the session established in respect to the second callee.

5. The network facsimile apparatus of claim 4,
   wherein the control section deletes the second IP address stored in the storage section at a same time when the control section opens the session in respect to the second callee.

6. The network facsimile apparatus of claim 1, wherein, when transmitting the image data, the control section deletes the first IP address of the first callee from the storage section.

7. The network facsimile apparatus of claim 1, wherein the control section makes the storage section store reserved image data to be transmitted in it.

8. A network facsimile system, comprising:
   a network facsimile apparatus serving as a caller; and
   a first network facsimile apparatus serving as at least a first callee;
   wherein each of the network facsimile apparatus and the first network facsimile apparatus establishes a session based on a Session Initiation Protocol to conduct image data communicating operations with other apparatuses coupled to the network facsimile system; and
   wherein the network facsimile apparatus comprises:
      a control section to suspend an operation for transmitting image data to the first network facsimile apparatus serving as the first callee when the first callee sends a communication incapable signal back to the network facsimile apparatus serving as the caller in response to a session establishment request directed to the first callee and originally issued by the caller;
      a storage section to store a first IP address of the first callee;
      a network interface control section that receives a session establishment request sent from a second callee after the first IP address of the first callee is stored in the storage section, and then, sends a session establishment response back to the second callee;
      a comparing section to compare the first IP address of the first callee, stored in the storage section, with a second IP address of the second callee, when image data are not transmitted to the caller from the second callee within a first predetermined time interval after the session establishment response is sent back to the second callee; and
   wherein the first network facsimile apparatus, comprises:
      a first network interface control section that receives a session establishment request sent from the caller;
      a first control section to control the first network interface control section so that a communication incapable signal is sent back to the caller in response to the session establishment request received by the first network interface control section when the first network facsimile apparatus, serving as the first callee is currently in a state incapable of establishing the session; and a first storage section to store an IP address of the caller; and wherein, when the control section of the network facsimile apparatus determines that the first IP address and the second IP address coincide with each other, based on a comparison result of the comparing section, the control section conducts controlling operations so as to transmits the image data, transmission of which is currently suspended, to the second callee; and wherein, when the first network facsimile apparatus, serving as the first callee currently enters in another state capable of establishing the session with the caller, the first control section of the first network facsimile apparatus conducts controlling operations so that the first network facsimile apparatus, serving as the first callee calls the caller based on the IP address of the network facsimile apparatus, stored in the storage section, through the first network interface control section.

9. The network facsimile system of claim 8, wherein, when the control section determines that the first IP address and the second IP address do not coincide with each other, the control section opens the session established in respect to the second callee.

10. The network facsimile system of claim 9, wherein the control section deletes the second IP address of the second callee from the storage section at a same time when the control section opens the session established in respect to the second callee.

11. The network facsimile system of claim 8, wherein, when image data are not transmitted to the caller from the second callee within the predetermined time interval after the session establishment response is sent back to the second callee and none of image data to be transmitted are reserved in the caller itself, the control section opens the session established in respect to the second callee.

12. The network facsimile system of claim 11, wherein the control section deletes the second IP address of the second callee from the storage section at a same time when the control section opens the session established in respect to the second callee.

13. The network facsimile system of claim 8, wherein the control section makes the storage section store reserved image data to be transmitted in it.

14. The network facsimile system of claim 8, wherein the first control section waits arrival of image data to be transmitted from the caller after the session is established with the caller as a result of calling the caller through the first network interface control section; and wherein, when the image data arrives at the first callee before a second predetermined time interval elapses, the control section conducts controlling operations so as to receive the image data, while, when the image data does not arrive at the first callee even after the second predetermined time interval has elapsed, the first control section opens the session established in respect to the caller.

15. The network facsimile system of claim 14, wherein the second predetermined time interval is longer than the first predetermined time interval.

16. The network facsimile apparatus of claim 6, wherein the first control section deletes the IP address of the caller stored in the first storage section when the first callee calls the caller.

\* \* \* \* \*